United States Patent
Downing et al.

(10) Patent No.: US 8,196,150 B2
(45) Date of Patent: Jun. 5, 2012

(54) EVENT LOCALITY USING QUEUE SERVICES

(75) Inventors: Alan Downing, Fremont, CA (US); Krishnan Meiyyappan, Fremont, CA (US); James Stamos, Sanatoga, CA (US); Ramkumar Venkatesan, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1273 days.

(21) Appl. No.: 11/246,043

(22) Filed: Oct. 7, 2005

(65) Prior Publication Data

US 2007/0101341 A1    May 3, 2007

(51) Int. Cl.
G06F 3/00 (2006.01)
G06F 15/173 (2006.01)

(52) U.S. Cl. ........................ 719/314; 709/238
(58) Field of Classification Search .................. None
See application file for complete search history.

(56) References Cited

U.S. PATENT DOCUMENTS

| | | |
|---|---|---|
| 4,318,182 A | 3/1982 | Bachman et al. |
| 5,113,522 A | 5/1992 | Dinwiddie et al. |
| 5,222,217 A | 6/1993 | Blount et al. |
| 5,347,632 A | 9/1994 | Filepp et al. |
| 5,357,612 A | 10/1994 | Alaiwan |
| 5,465,328 A | 11/1995 | Dievendorff et al. |
| 5,627,764 A | 5/1997 | Schutzman et al. |
| 5,649,102 A | 7/1997 | Yamauchi et al. |
| 5,721,825 A | 2/1998 | Lawson et al. |
| 5,790,807 A | 8/1998 | Fishler et al. |
| 5,802,253 A | 9/1998 | Gross et al. |
| 5,828,835 A | 10/1998 | Isfeld et al. |
| 5,841,973 A | 11/1998 | Kessler et al. |
| 5,870,562 A | 2/1999 | Butman et al. |
| 5,878,056 A | 3/1999 | Black et al. |
| 5,884,035 A | 3/1999 | Butman et al. |
| 5,890,167 A | 3/1999 | Bridge, Jr. et al. |
| 5,933,604 A | 8/1999 | Inakoshi |
| 5,940,839 A | 8/1999 | Chen et al. |
| 5,951,694 A | 9/1999 | Choquier et al. |

(Continued)

FOREIGN PATENT DOCUMENTS

EP    0 750 256 A2    6/1996

(Continued)

OTHER PUBLICATIONS

Chase, Jeffrey S. et al., "Dynamic Virtual Clusters in a Grid Site Manager," Proceedings of the 12th IEEE International Symposium on High Performance Distributed Computing (HPDC'03), 2003, IEEE, pp. 90-100.

(Continued)

*Primary Examiner* — Lechi Truong
*Assistant Examiner* — Tuan Dao
(74) *Attorney, Agent, or Firm* — Hickman Palermo Truong Becker Bingham Wong LLP

(57) ABSTRACT

An approach for reducing transport of messages between nodes of a multi-node system is presented wherein a message queue is associated with a queue service, and based on which node the message queue resides, one of the nodes is registered as hosting the associated queue service. In response to a client attempting to connect and requesting a particular queue service, the client is caused to connect to the node on which the queue service resides.

20 Claims, 2 Drawing Sheets

U.S. PATENT DOCUMENTS

| | | | |
|---|---|---|---|
| 6,026,430 | A | 2/2000 | Butman et al. |
| 6,029,205 | A | 2/2000 | Alferness et al. |
| 6,041,357 | A | 3/2000 | Kunzelman et al. |
| 6,058,389 | A | 5/2000 | Chandra et al. |
| 6,088,728 | A | 7/2000 | Bellemore et al. |
| 6,182,086 | B1 | 1/2001 | Lomet et al. |
| 6,182,252 | B1 | 1/2001 | Wong et al. |
| 6,188,699 | B1 | 2/2001 | Lang et al. |
| 6,243,751 | B1 | 6/2001 | Chatterjee et al. |
| 6,334,114 | B1 | 12/2001 | Jacobs et al. |
| 6,338,074 | B1 | 1/2002 | Poindexter et al. |
| 6,393,423 | B1 | 5/2002 | Goedken |
| 6,434,605 | B1 | 8/2002 | Faulkner et al. |
| 6,442,568 | B1 | 8/2002 | Velasco et al. |
| 6,446,204 | B1 * | 9/2002 | Pang et al. ............ 713/153 |
| 6,473,794 | B1 | 10/2002 | Guheen et al. |
| 6,493,826 | B1 | 12/2002 | Schofield et al. |
| 6,515,968 | B1 | 2/2003 | Combar et al. |
| 6,519,571 | B1 | 2/2003 | Guheen et al. |
| 6,529,932 | B1 | 3/2003 | Dadiomov et al. |
| 6,536,037 | B1 | 3/2003 | Guheen et al. |
| 6,560,237 | B1 | 5/2003 | Hiscock et al. |
| 6,614,900 | B1 | 9/2003 | Champoux |
| 6,654,907 | B2 | 11/2003 | Stanfill et al. |
| 6,658,596 | B1 | 12/2003 | Owen |
| 6,691,155 | B2 | 2/2004 | Gottfried |
| 6,704,831 | B1 | 3/2004 | Avery |
| 6,826,182 | B1 | 11/2004 | Parthasarathy |
| 7,149,212 | B2 | 12/2006 | Calvignac et al. |
| 7,185,033 | B2 | 2/2007 | Jain et al. |
| 7,185,034 | B2 | 2/2007 | Jain et al. |
| 7,203,706 | B2 | 4/2007 | Jain et al. |
| 7,546,613 | B2 | 6/2009 | Ikeda et al. |
| 7,571,241 | B1 | 8/2009 | Nalawade |
| 7,584,472 | B1 | 9/2009 | McCormick et al. |
| 2001/0032137 | A1 | 10/2001 | Bennett et al. |
| 2001/0047270 | A1 | 11/2001 | Gusick et al. |
| 2001/0052137 | A1 | 12/2001 | Klein |
| 2002/0049845 | A1 | 4/2002 | Sreenivasan et al. |
| 2002/0073139 | A1 | 6/2002 | Hawkins et al. |
| 2002/0112008 | A1 | 8/2002 | Christenson et al. |
| 2002/0116457 | A1 | 8/2002 | Eshleman et al. |
| 2002/0138582 | A1 | 9/2002 | Chandra et al. |
| 2002/0144010 | A1 | 10/2002 | Younis et al. |
| 2002/0161896 | A1 | 10/2002 | Wen et al. |
| 2002/0194081 | A1 | 12/2002 | Perkowski |
| 2003/0037146 | A1 | 2/2003 | O'Neill |
| 2003/0039212 | A1 | 2/2003 | Lloyd et al. |
| 2003/0093471 | A1 * | 5/2003 | Upton ............ 709/203 |
| 2003/0110085 | A1 | 6/2003 | Murren et al. |
| 2003/0135609 | A1 | 7/2003 | Carlson et al. |
| 2003/0177187 | A1 | 9/2003 | Levine et al. |
| 2003/0212657 | A1 | 11/2003 | Kaluskar et al. |
| 2003/0212670 | A1 | 11/2003 | Yalamanchi et al. |
| 2003/0236834 | A1 | 12/2003 | Gottfried |
| 2004/0024771 | A1 | 2/2004 | Jain et al. |
| 2004/0024774 | A1 * | 2/2004 | Jain et al. ............ 707/102 |
| 2004/0024794 | A1 | 2/2004 | Jain et al. |
| 2004/0034640 | A1 * | 2/2004 | Jain et al. ............ 707/10 |
| 2004/0034664 | A1 | 2/2004 | Jain et al. |
| 2004/0064548 | A1 | 4/2004 | Adams et al. |
| 2004/0103195 | A1 | 5/2004 | Chalasani et al. |
| 2004/0107125 | A1 | 6/2004 | Guheen et al. |
| 2004/0235523 | A1 * | 11/2004 | Schrire et al. ............ 455/558 |
| 2005/0021622 | A1 * | 1/2005 | Cullen ............ 709/204 |
| 2005/0246186 | A1 * | 11/2005 | Nikolov ............ 705/1 |
| 2005/0262205 | A1 | 11/2005 | Nikolov et al. |
| 2006/0168080 | A1 | 7/2006 | Surlaker et al. |

FOREIGN PATENT DOCUMENTS

| | | |
|---|---|---|
| EP | 0 942 363 A2 | 9/1999 |
| EP | 0 992 909 A2 | 4/2000 |
| EP | 1 170 662 A2 | 1/2002 |
| EP | 1 260 902 A2 | 5/2002 |
| WO | WO 0010084 A | 2/2000 |
| WO | WO 02/05116 A2 | 1/2002 |
| WO | WO 02/097676 A2 | 12/2002 |
| WO | WO 03/014928 A2 | 2/2003 |
| WO | WO 03014929 A | 2/2003 |
| WO | WO 03/062983 A2 | 7/2003 |

OTHER PUBLICATIONS

Gunther, Oliver, et al., "MMM: A Web-Based System for Sharing Statistical Computing Modules," IEEE, May-Jun. 1997, vol. 1, Issue 3, pp. 59-68.

Kokku, Ravi et al., "Half-pipe Anchoring: An Efficient Technique for Multiple Connection Handoff," Proceedings $10^{th}$ International Conference on Network Protocols, Nov. 12, 2002, XP010632563, 10 pages.

Kurakawa, Kei et al., "Life Cycle Design Support Based on Environmental Information Sharing," IEEE, Feb. 1-3, 1999, Proceedings EcoDesign '99, First International Symposium, pp. 138-142.

Lin, Ying-Dar et al., "Direct Web Switch Routing with State Migration, TCP Masquerade, and Cookie Name Rewriting," Globecom 2003, IEEE Global Telecommunications Conference, Dec. 1, 2003, IEEE, CP010677300, pp. 3663-3667.

Skow, Eric, et al., "A Security Architecture for Application Session Handoff," 2002, IEEE International Conference Proceedings, Apr. 28-May 2, 2002, vol. 1 of 5, pp. 2058-2063, XP010589848.

Song, Henry, et al., "Browser State Repository Service," Lecture Notes in Computer Science, vol. 2414, 2002, pp. 1-14, XP002904339.

International Searching Authority, "Notification of Transmittal of the International Search Report and the Written Opinion of the International Searching Authority, or the Declaration," PCT/US2004/026570, Nov. 12, 2004, 13 pages.

European Patent Office, "International Preliminary Report on Patentability," Aug. 26, 2005, International Application No. PCT/US2004/026570, 9 pages.

Current Claims of International Application No. PCT/US2004/026570, 4 pages.

International Searching Authority, "Notification of Transmittal of the International Search Report and the Written Opinion of the International Searching Authority, or the Declaration," PCT/US2004/026389, Aug. 4, 2005, 13 pages.

Current Claims for International Application No. PCT/US2004/026389, pp. 1-7.

International Searching Authority, "Notification of Transmittal of the International Search Report and the Written Opinion of the International Searching Authority, or the Declaration," PCT/US2004/025805, dated Dec. 3, 2004, 12 pages.

Current Claims of International Application No. PCT/US2004/025805, 8 pages.

International Preliminary Examining Authority, "Written Opinion of the International Preliminary Examining Authority," PCT/US2004/025805, Jun. 7, 2005, 4 pages.

International Searching Authority, "Notification of Transmittal of the International Search Report or the Declaration," PCT/US03/23747, dated May 25, 2004, 6 pages.

Current Claims in PCT application, International Application No. PCT/US03/23747, 14 pages.

International Searching Authority, "Notification of the Transmittal of the International Search Report and Written Opinion of the International Searching Authority, or the Declaration," PCT/US2005/025887, dated Feb. 6, 2006, 12 pages.

Current Claims, PCT/US2005/025887, 3 pages.

Office Action from CN for foreign patent application No. 03821299.4 dated Dec. 24, 2007 (4 pgs) with English translation (4 pgs).

Current claims in CN for foreign patent application No. 03821299.4 (6 pgs).

Microsoft Message Queuing Services: A Guide to Reviewing Microsoft Message Queuing Server Release 1.0, 1997 Microsoft Corporation.

* cited by examiner

EVENT LOCALITY USING QUEUE SERVICES

CROSS-REFERENCE TO RELATED APPLICATIONS

This application is related to U.S. patent application Ser. No. 11/192,830, entitled "REPEATABLE MESSAGE STREAMS FOR MESSAGE QUEUES IN DISTRIBUTED SYSTEMS", filed by Kapil Surlaker et al. on Jul. 29, 2005, and issued as U.S. Pat. No. 7,818,386 on Oct. 19, 2010, the entire contents of which are herein incorporated by reference for all purposes as if originally set forth herein.

This application is related to U.S. patent application Ser. No. 10/443,206, entitled "BUFFERED MESSAGE QUEUE ARCHITECTURE FOR DATABASE MANAGEMENT SYSTEMS", filed by Namit Jain et al. on May 21, 2003, and issued as U.S. Pat. No. 7,181,482 on Feb. 20, 2007, the entire contents of which are herein incorporated by reference for all purposes as if originally set forth herein.

This application is related to U.S. patent application Ser. No. 10/443,175, entitled "BUFFERED MESSAGE QUEUE ARCHITECTURE FOR DATABASE MANAGEMENT SYSTEMS WITH UNLIMITED BUFFERED MESSAGE QUEUE WITH LIMITED SHARED MEMORY", filed by Namit Jain et al. on May 21, 2003, and issued as U.S. Pat. No. 7,185,033 on Feb. 27, 2007, the entire contents of which are herein incorporated by reference for all purposes as if originally set forth herein.

This application is related to U.S. patent application Ser. No. 10/443,323, entitled "BUFFERED MESSAGE QUEUE ARCHITECTURE FOR DATABASE MANAGEMENT SYSTEMS WITH GUARANTEED AT LEAST ONCE DELIVERY", filed by Namit Jain et al. on May 21, 2003, and issued as U.S. Pat. No. 7,185,034 on Feb. 27, 2007, the entire contents of which are herein incorporated by reference for all purposes as if originally set forth herein.

This application is related to U.S. patent application Ser. No. 10/443,207, entitled "BUFFERED MESSAGE QUEUE ARCHITECTURE FOR DATABASE MANAGEMENT SYSTEMS WITH MEMORY OPTIMIZATIONS AND 'ZERO COPY' BUFFERED MESSAGE QUEUE", filed by Namit Jain et al. on May 21, 2003, and issued as U.S. Pat. No. 7,203,706 on Apr. 10, 2007, the entire contents of which are herein incorporated by reference for all purposes as if originally set forth herein.

This application is related to U.S. patent application Ser. No. 10/443,174, entitled "BUFFERED MESSAGE QUEUE ARCHITECTURE FOR DATABASE MANAGEMENT SYSTEMS WITH TRANSACTIONAL ENQUEUE SUPPORT", filed by Namit Jain et al. on May 21, 2003, the entire contents of which are herein incorporated by reference for all purposes as if originally set forth herein.

This application is related to U.S. patent application Ser. No. 10/917,715, entitled "MANAGING WORKLOAD BY SERVICE", filed by Carol Colrain et al. on Aug. 12, 2004, and issued as U.S. Pat. No. 7,664,847 on Feb. 16, 2010, the entire contents of which are herein incorporated by reference for all purposes as if originally set forth herein.

FIELD OF THE INVENTION

The present invention relates to managing of information by computer systems. The invention relates more specifically to an approach for reducing transport of messages between nodes.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Messaging is a communication model that is used to handle the complexity of communications between multiple entities in one or more computer systems. In the context of computer systems, the term "message" may refer to any item that includes data of any data type or format. For example, a database application for a Database Management System (DBMS) may submit a request for data in the form of a message to a database server and the request is stored in a message queue of the DBMS. Furthermore, messages may be stored persistently, may be propagated between queues on different nodes of a distributed DBMS, and may be transmitted over a network.

Messages may be instantiations of events, such as a business event or IT event. Business events are events explicitly generated and/or consumed by applications. Some examples of business events may be: customer transactions, bank orders, and stock transactions. IT events indicate changes in a database state. Some examples of IT events include a customer order resulting in a database update or a price change being captured automatically from a database update.

As used herein, the terms "message queue" and "queue" refer to a message queue implemented in a volatile memory, such as a Random Access Memory (RAM). The volatile memory may be a shared volatile memory that is accessible by a plurality of processes. A message queue may also be used in conjunction with a storage space in non-volatile permanent store for storing messages from the queue, such as, for example, a database, a table in a database, a file system, or a file in a file system. Message queues used in conjunction with storage space in permanent store are typically used as a communication mechanism by information systems that require a high quality of messaging service, such as, for example, guaranteed delivery of messages even in the event of an information system crash or failure.

As described herein, messages may be published and consumed from any number of separate nodes. These nodes may be part of a database cluster with a shared disk architecture that runs on multiple machines, attached through a cluster interconnect and a shared storage subsystem. Nodes of the cluster may be on different machines, but the cluster appears to be a single database to a client. If the publisher(s) and/or subscriber(s) of messages are on different nodes, then the messages need to be transported over a network, in the case of non-persistent queues, or saved to a common storage medium and copied on another node, in the case of persistent queues.

If a client connects to a node that does not own the message queue utilized by the user, then all messages and events generated by the service must be promulgated to the node to which the user has connected. This incurs significant overhead in both nonpersistent and persistent messaging systems.

In a system that has multiple publishers and multiple consumers, and in which messages may be transferred from some queues to other queues, the specific techniques used to propagate messages in the system can have a significant impact on the performance in areas such as recoverability and memory usage. Therefore it is desirable to provide mechanisms for efficiently managing the queues, the propagation of messages, and the resources involved in propagating the messages.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
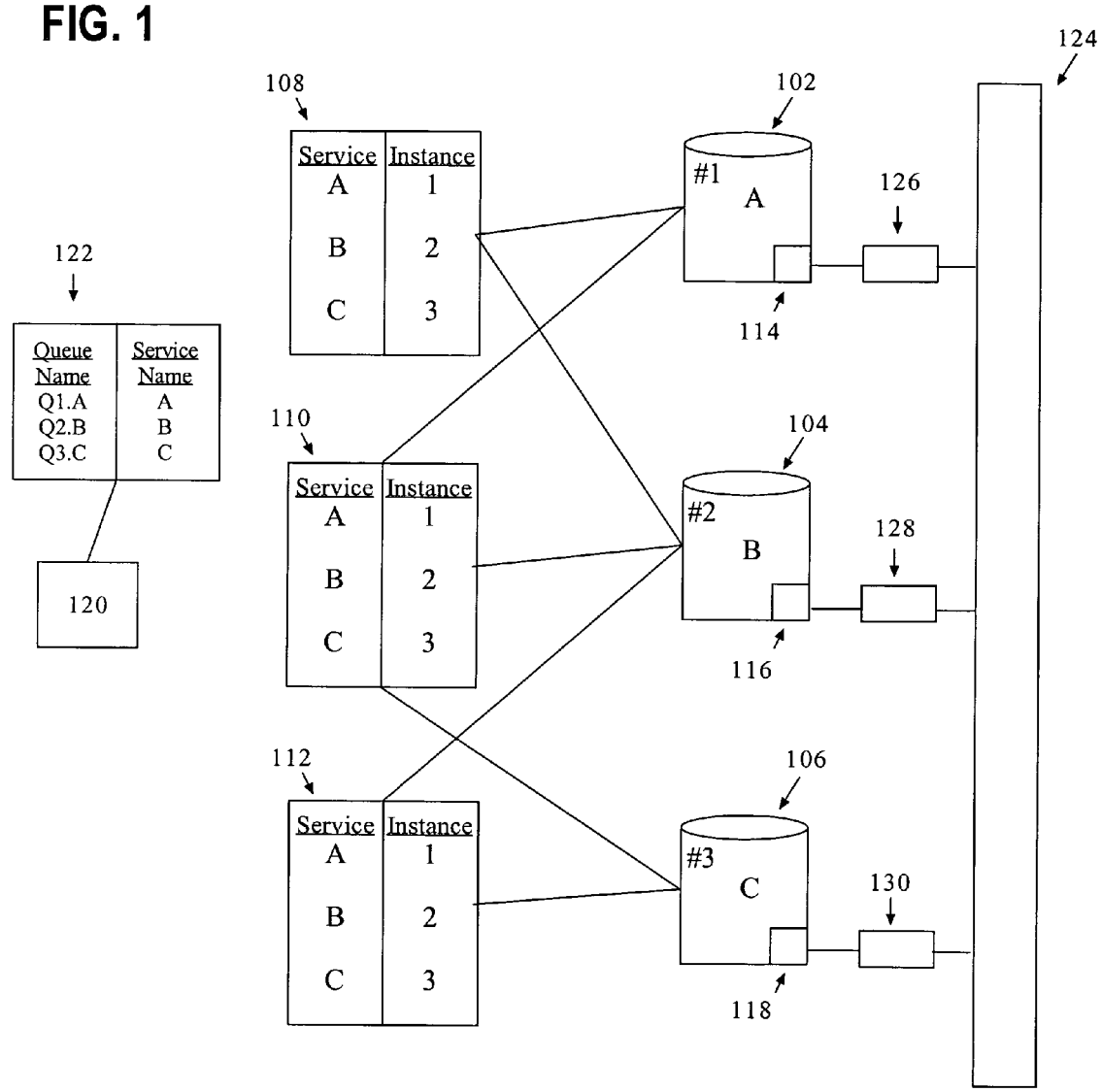
FIG. 1 is a block diagram that illustrates one embodiment of the invention.

In the following description, for the purposes of explanation, numerous specific details are set forth in order to provide a thorough understanding of the present invention. It will be apparent, however, that the present invention may be practiced without these specific details. In other nodes, well-known structures and devices are shown in block diagram form in order to avoid unnecessarily obscuring the present invention.

A message queue is associated with a queue service, as defined herein. The queue service is hosted by a node in a multi-node system on which the associated message queue exists. Clients connect to the multi-node system and request a queue service, and are automatically connected to the node on which the queue service and associated message queue resides. As a result, the client may interact with the message queue locally on one node rather than incur the overhead of transmitting messages from one node to another node on which the message queue resides.

Message Queue Architecture

A buffered message queue architecture for managing messages in a database management system is used to illustrate an embodiment of the present invention. As used herein, the term "buffered message queue" refers to a message queue implemented in a volatile memory, such as a RAM. The volatile memory may be a shared volatile memory that is accessible by a plurality of processes. According to one embodiment of the invention, an approach for managing messages in a database system includes creating a message queue in a shared volatile memory of the database system. A message is stored in the message queue and then a determination is made whether the message satisfies subscription data for a subscriber process. If so, then the message is provided to the subscriber process, without having to first store the message in a persistent message queue.

The buffered message queue architecture supports a publish and subscribe communication mechanism, where the message producers and message consumers may be decoupled from and independent of each other. An entity that produces a message is referred to as a "publisher." An entity interested in messages in a buffered message queue "subscribes" to the buffered message queue and is referred to as a "subscriber." A publisher may publish or "enqueue" messages to the buffered message queue. The messages become available to the subscribers who may "consume" or "dequeue" the messages that they are eligible for from the buffered message queue.

The buffered message queue architecture provides most the functionality of a persistent publish-subscriber messaging system, without ever having to store the messages in persistent storage. The buffered message queue architecture provides better performance and scalability since no persistent operations are needed and no UNDO/REDO logs need to be maintained. Messages published to the buffered message queue are delivered to all eligible subscribers at least once, even in the event of failures, as long as the application is "repeatable." This is in contrast to persistent messaging systems where there is exactly one delivery of messages to subscribers for all applications.

In an embodiment, a method for propagating messages in a distributed system is described. A set of messages enqueued in a source queue are sent to one or more destination queues. An acknowledgement is received from each of the one or more destination queues, where the acknowledgement indicates which messages of the set of messages have been consumed at the particular destination queue. Based on the acknowledgements, one or more messages of the set messages are removed from, or otherwise ceased to be maintained in, the source queue.

In an embodiment, the publisher and subscriber are on different nodes in a database cluster. In this embodiment, network overhead is accrued because messages must be sent over a network from one node to another, in the case of nonpersistent messaging. In the case of persistent messaging, one node publishes the message in a cache that is written to a shared disk, and must be stored by the subscriber. One embodiment provides an approach to allow a node in a database cluster to "own" a queue. This queue is associated with a service on a node. This is called the "queue service." The node publishes a list of services provided on that node and registers the queue service with an intermediary between a client and the multiple cluster nodes. In this embodiment, the client may connect directly to the node that owns the particular queue service the client is requesting. This matching of service to node allows messages to be processed on the same node offering the service to which the messages pertain. Therefore, there is no need to transmit messages over a network between nodes.

In one embodiment, if a node that is registered as the owner of a queue fails, the queue ownership is automatically migrated to another alive node. The queue service moves with the queue ownership to the new owner node. Other aspects encompass a computer-readable medium configured to carry out the foregoing steps. In addition, the techniques described herein may be implemented in a variety of computer systems including, but not limited to, Database Management Systems (DBMSs), Operating Systems (OSs), e-mail exchange systems, Internet information systems, information indexing systems, and telecommunication network systems.

As discussed earlier, the buffered message queue architecture may be implemented on a database cluster system that consists of a database with a shared disk architecture running on multiple machines. The machines are attached through a cluster interconnect and a shared storage subsystem. In this embodiment, the database cluster appears to be a single standard database to clients and users.

Messages may be instantiations of events. If the publisher (s) and subscriber(s) of an event are on different nodes of the cluster, the event needs to be transported to the subscriber's node's local store. In the case of non-persistent events, this transport needs to be done on every event access. In the case of persistent events, the event needs to be written to a local cache, which is written to a shared disk, and then copied by the subscribing node on every event access. This is poor event locality and creates adverse effects on performance. When the publisher and subscriber are on the same node, all event processing may be done on a single node, leading to better event locality.

Queue Service

In one embodiment, a message queue (or a set of one or more message queues) are associated with a queue service on the clustered database system. A service is a category of work that may be executed by any number of nodes in a multi-node system, such as a clustered database service. A subset of one or more nodes within the multi-node system may be designated to provide a service. The nodes are referred to herein as hosting the service and the service is referred to as running on the subset.

A queue service is associated with a buffered message queue. The node on which buffered message queue is stored is designated as providing a queue service. The structures required for buffered messaging in that queue are implemented on the node of the cluster hosting the queue service. The node where the buffered messaging structures are implemented is the "owner" of the queue. Enqueue and dequeue requests received at other nodes are forwarded over a network to the node owning the queue.

In one embodiment of the invention, a listener process runs on each node of a clustered database to which clients connect. Each node publishes its services to each listener, and a listing of which nodes offer which services is continually updated to each listener. In one embodiment, by enabling a client to connect directly to the node that is the owner of the particular queue service associated with the queue with which the client is transmitting messages, thereby eliminating the need for forwarding messages.

Database Cluster

A database cluster is a set of nodes that hosts a multi-node database server that manages access to a particular database. The nodes in a database cluster may be in the form of computers (e.g. work stations, personal computers) interconnected via a network, and may be part of a grid.

A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients. Resources from multiple nodes in a distributed computer system can be allocated to running a particular server's software. A particular combination of the software on a node and the allocation of the resources from the node is a server that is referred to herein as a server instance or instance. Thus, a distributed server comprises multiple server instances that can run on multiple nodes. Several instances of a distributed server can even run on the same node.

A database server governs and facilitates access to a particular database, processing requests by clients to access the database. A multi-node database server comprises multiple "database instances", each database instance running on a node, and governing and facilitating access to one or more databases. A multi-node database server that governs and facilitates access to a particular database may be referred to herein as a multi-node database server. Database instances thus comprise a multi-node database server. In another example, the database instances on a multi-node database server may access separate databases.

FIG. 1 is a block diagram illustrating an embodiment of the invention. In one embodiment, a database cluster 100 is presented, comprised of three nodes 102, 104, 106. Each node 102-106 hosts a service (A, B, C) and a queue service 114, 116, 118, respectively. Node One 102 is providing service A. Node Two 104 is providing service B. Node Three 106 is providing service C. Each node is running a listener process 108, 110, 112. Each node 102-106 registers its queue service 114-118 with its listener process 108-112. In one embodiment, each listener process 108-112 is connected via network to each node.

Each listener process 108-112 maintains a data structure storing the nodes and their registered services. This is updated such that each listener process always has a current list of services and the node that owns them.

A queue service name is associated with each queue in the cluster and displayed in a view 122 available to a client. Thus queue service name refers to the node with the most efficient access for buffered messaging. A client 120 may request to connect to a particular queue service by contacting any listener 108-112 for any node 102-106. The listener 108-112 utilizes the data structure correlating services and nodes owning the services to connect the client to the node hosting the requested queue service. This allows all events pertaining to a queue service to be processed on the same node, eliminating the need to transfer messages between nodes.

While this embodiment utilizes a nonpersistent queue, other embodiments are envisioned utilizing a persistent queue. Each node has a cache 126, 128, 130 connected to a shared disk 124. By allowing events to be processed on the node consuming them, the need for messages to be written to the cache 126-130, stored on the shared disk 124 and re-cached on a different node is eliminated.

In one embodiment, in the event a node fails, the queue ownership is migrated from the failed node to another live node. The corresponding queue service is registered to the new owner node. The data structures on each listener are updated with the change, making the process transparent to the client.

In one embodiment, the invention may be utilized to support single-instance objects in a database cluster. As an example, pipes may be utilized in addition to message queues. A pipe is an area of memory used by one process to pass information to another process. Pipes allow two or more sessions in the same instance communicate. In one embodiment, both reading from a named pipe and writing to a named pipe may be accomplished using the techniques described herein.

Hardware Overview

Figure 2:
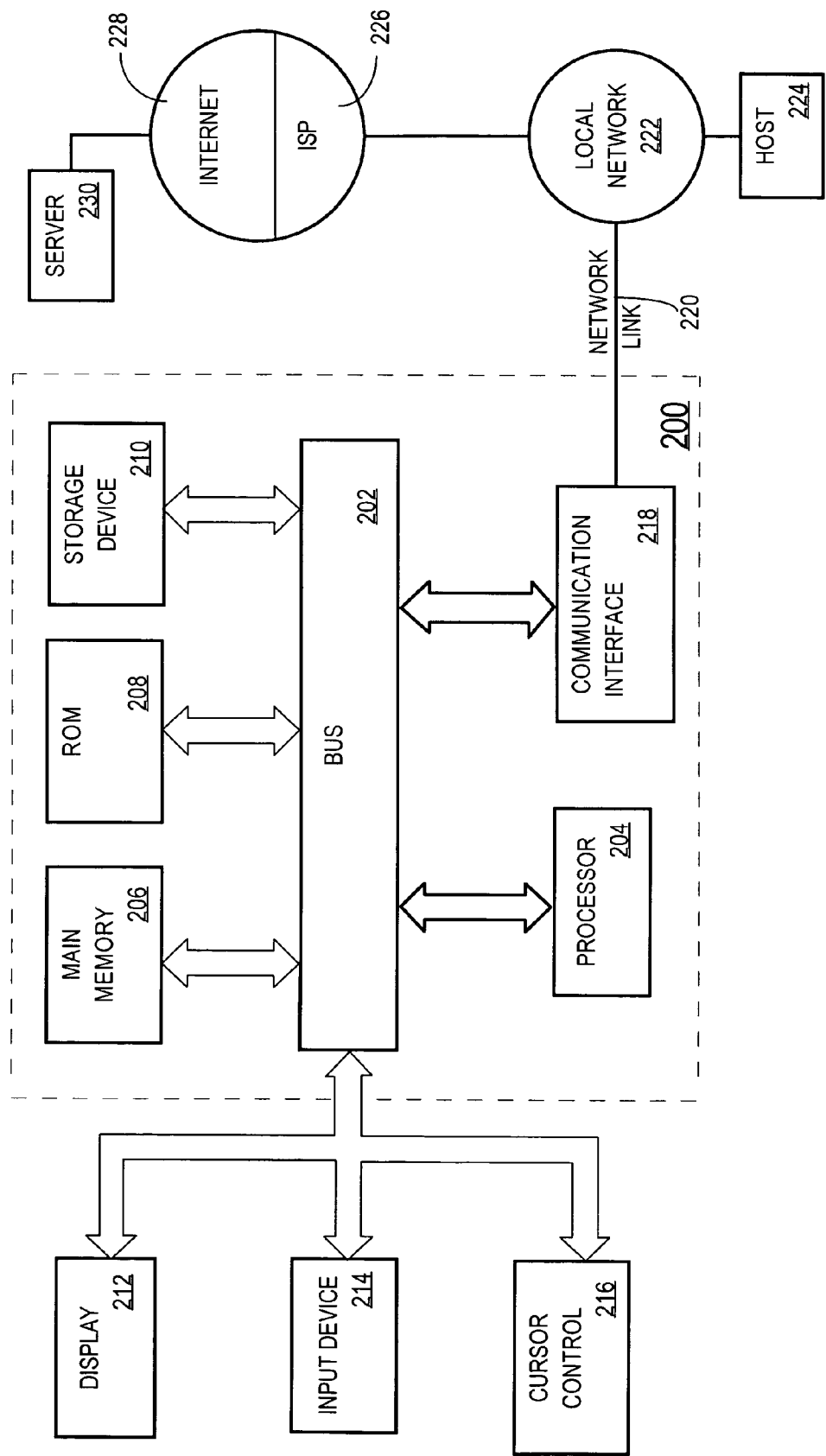
FIG. 2 is a block diagram that illustrates a computer system upon which an embodiment may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for a multi-node system comprising a plurality of nodes, the method comprising:
   a first node of said plurality of nodes generating registration data, that for each node in said plurality of nodes, associates a named queue service with a message queue hosted on said each node, said first node generating said registration data at least in part in response to receipt of respective one or more messages from each other node of said plurality of nodes, said respective one or more messages being sent to register said each other node as owner of the respective message queue hosted on said each other node;
   said first node sending a message to said each other node of said plurality of nodes to register said first node as owner of a respective message queue hosted on said first node; and
   for said each other node of said plurality of nodes:
     receiving from a client a connection request that requests the respective named queue service;
     in response to receiving the connection request that requests the respective named queue service, based on said registration data, said first node determining that said each other node hosts said named queue service; and said first node causing said client to connect to said each other node to interact with the respective message queue without having to transmit messages via said first node, wherein to interact with the respective message queue without having to transmit messages via said first node includes enqueuing or dequeuing messages from said message queue.

2. The method of claim 1, the steps further comprising:

migrating a respective message queue of a second node of the other nodes to a third node of the other nodes; and in response to migrating a respective message queue, said first node generating registration data that associates the named queue service of the migrated message queue with said third node.

3. The method of claim 2, wherein migrating is performed in response to failure of the second node.

4. The method of claim 1, wherein a client of a hosted message queue of a node of said plurality of nodes is a publisher of messages.

5. The method of claim 1, wherein a client of a hosted message queue of a node of said plurality of nodes is a subscriber of messages.

6. The method of claim 1, wherein said multi-node system comprises a database system.

7. The method of claim 1, wherein for a particular node of said plurality of nodes, a publisher and subscriber of the respective hosted message queue are hosted on the particular node.

8. The method of claim 1, wherein for a particular node of said plurality of nodes said respective message queue comprises a buffered message queue.

9. The method of claim 1, wherein the respective message queue of each node of said plurality of nodes is non-persistent.

10. The method of claim 1, wherein the respective message queue of each node of said plurality of nodes is persistent.

11. A non-transitory computer-readable storage medium storing one or more sequences of instructions which, when executed by one or more processors, causes the one or more processors to perform the steps of:

a first node of said plurality of nodes generating registration data, that for each node in said plurality of nodes, associates a named queue service with a message queue hosted on said each node, said first node generating said registration data at least in part in response to receipt of respective one or more messages from each other node of said plurality of nodes, said respective one or more messages being sent to register said each other node as owner of the respective message queue hosted on said each other node;

said first node sending a message to said each other node of said plurality of nodes to register said first node as owner of a respective message queue hosted on said first node; and for said each other node of said plurality of nodes:

receiving from a client a connection request that requests the respective named queue service;

in response to receiving the connection request that requests the respective named queue service, based on said registration data, said first node determining that said each other node hosts said named queue service; and said first node causing said client to connect to said each other node to interact with the respective message queue without having to transmit messages via said first node, wherein to interact with the respective message queue without having to transmit messages via said first node includes enqueuing or dequeuing messages from said message queue.

12. The non-transitory computer-readable storage medium of claim 11, the steps further comprising:

migrating a respective message queue of a second node of the other nodes to a third node of the other nodes; and in response to migrating a respective message queue, said first node generating registration data that associates the named queue service of the migrated message queue with said third node.

13. The non-transitory computer-readable storage medium of claim 12, wherein migrating is performed in response to failure of the second node.

14. The non-transitory computer-readable storage medium of claim 11, wherein a client of a hosted message queue of a node of said plurality of nodes is a publisher of messages.

15. The non-transitory computer-readable storage medium of claim 11, wherein a client of a hosted message queue of a node of said plurality of nodes is a subscriber of messages.

16. The non-transitory computer-readable storage medium of claim 11, wherein said multi-node system comprises a database system.

17. The non-transitory computer-readable storage medium of claim 11, wherein for a particular node of said plurality of nodes, a publisher and subscriber of the respective hosted message queue are hosted on the particular node.

18. The non-transitory computer-readable storage medium of claim 11, wherein for a particular node of said plurality of nodes said respective message queue comprises a buffered message queue.

19. The non-transitory computer-readable storage medium of claim 11, wherein the respective message queue of each node of said plurality of nodes is non-persistent.

20. The non-transitory computer-readable storage medium of claim 11, wherein the respective message queue of each node of said plurality of nodes is persistent.

* * * * *

UNITED STATES PATENT AND TRADEMARK OFFICE
CERTIFICATE OF CORRECTION

Page 1 of 1

PATENT NO. : 8,196,150 B2
APPLICATION NO. : 11/246043
DATED : June 5, 2012
INVENTOR(S) : Downing et al.

It is certified that error appears in the above-identified patent and that said Letters Patent is hereby corrected as shown below:

On front page, in column 1, under "Inventors", line 3, delete "Sanatoga, CA" and insert -- Saratoga, CA --, therefor.

On front page, in column 1, under "Inventors", line 4-5, delete "Foster City," and insert -- Mountain View, --, therefor.

On page 2, in column 2, under "Other Publications", line 57-58, below "(4 pgs)." delete "Current claims in CN for foreign patent application No. 03821299.4 (6 pgs).".

Signed and Sealed this
Thirtieth Day of October, 2012

David J. Kappos
*Director of the United States Patent and Trademark Office*